US007741816B2

United States Patent
Kelty et al.

(10) Patent No.: US 7,741,816 B2
(45) Date of Patent: Jun. 22, 2010

(54) SYSTEM AND METHOD FOR BATTERY PREHEATING

(75) Inventors: Kurt Russell Kelty, Palo Alto, CA (US); Weston Arthur Hermann, Palo Alto, CA (US); Eugene Michael Berdichevsky, San Francisco, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 185 days.

(21) Appl. No.: 12/058,047

(22) Filed: Mar. 28, 2008

(65) Prior Publication Data

US 2009/0243538 A1 Oct. 1, 2009

(51) Int. Cl.
*H02J 7/04* (2006.01)
*H02J 7/16* (2006.01)

(52) U.S. Cl. .................. 320/153; 320/150; 429/62

(58) Field of Classification Search ............. 320/153; 429/62
See application file for complete search history.

(56) References Cited

U.S. PATENT DOCUMENTS

| 5,467,006 | A | * | 11/1995 | Sims | 237/5 |
| 5,565,755 | A | * | 10/1996 | Keith | 219/202 |
| 5,834,131 | A | * | 11/1998 | Lutz et al. | 429/7 |
| 5,994,669 | A | * | 11/1999 | McCall | 219/209 |
| 6,624,615 | B1 | * | 9/2003 | Park | 320/150 |
| 7,154,068 | B2 | * | 12/2006 | Zhu et al. | 219/202 |
| 7,189,942 | B2 | * | 3/2007 | Kotani et al. | 219/202 |
| 2008/0136653 | A1 | * | 6/2008 | Owens | 340/636.1 |

FOREIGN PATENT DOCUMENTS

WO WO-2009120369 A2 10/2009

* cited by examiner

*Primary Examiner*—Edward Tso
*Assistant Examiner*—Ramy Ramadan

(57) ABSTRACT

Some embodiments include a system, that includes an electric motor coupled to propel an electrical vehicle, a battery coupled to power the motor, a preheating system coupled to preheat the battery, a battery temperature comparator to compare a temperature of the battery to a target preheated temperature and to provide a battery below temperature signal when the battery temperature is below a specified temperature, a control circuit to determine the time remaining prior to a scheduled drive start time and to provide a preheating enable signal during a target time interval prior to the scheduled drive start time and a further control circuit to operate the preheating system in response to the battery below temperature signal and the preheating enable signal.

23 Claims, 11 Drawing Sheets

US 7,741,816 B2

SYSTEM AND METHOD FOR BATTERY PREHEATING

BACKGROUND

There are a number of negative aspects to burning fuel in an internal combustion engine to provide for transportation, such as cost, pollution, and the unnecessary depletion of natural resources. Vehicles having electric or partially electric propulsion machinery address some of these problems, but users seek more flexibility in how they use them.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Figure 1:
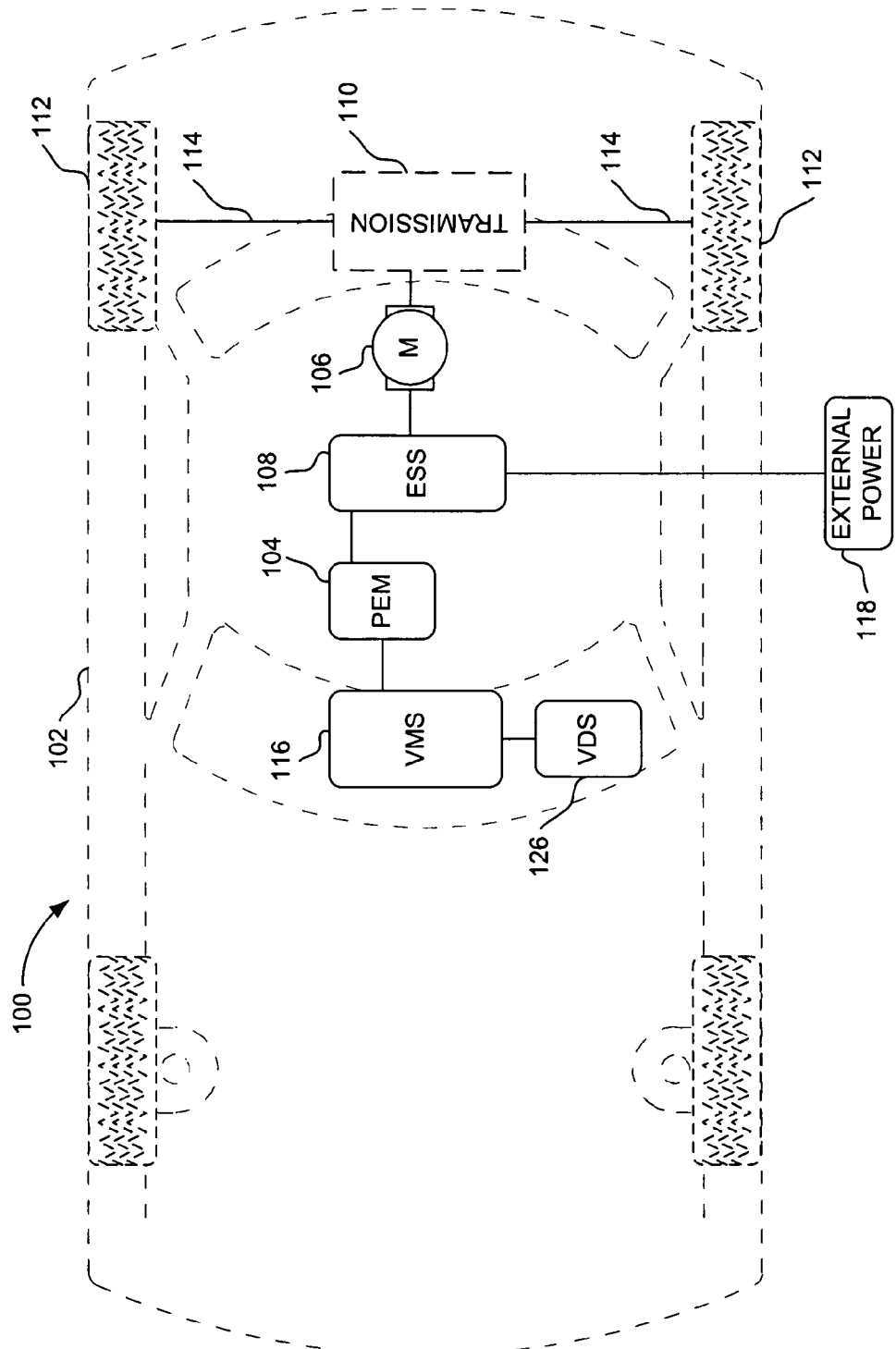
FIG. 1 is a diagram of a vehicle, according to some embodiments.

FIG. 1 is a high level diagram of a vehicle 100. Vehicles contemplated include, but are not limit to, ground based vehicles, aquatic vehicles, and aircraft. The present subject matter includes, but is not limited to, electric vehicles, hybrid electric vehicles including hybrid vehicles having series and/or parallel hybrid architecture (e.g., range extended vehicles), and other vehicles. In various embodiments, the vehicle 102 includes a vehicle propulsion battery 104 and at least one electric motor 106 coupled to propel the vehicle, with the battery coupled to power the motor. In various examples, the motor is for converting battery energy into mechanical motion, such as rotary motion. Some examples include vehicle propulsion batteries 104 that can be plugged in for charging, using energy from another source such as a municipal power grid.

The present subject matter includes examples in which the vehicle propulsion battery 104 is part of an energy storage system ("ESS"). In various embodiments, the ESS includes battery cells as well as various components associated with transmitting energy to and from other components such as battery cells, safety components, cooling components, heating components, rectifiers, etc. The present subject matter should not be construed to be limited to the configurations disclosed herein, as other configurations of a vehicle propulsion battery 104 and ancillary components are possible.

Various battery chemistries are contemplated. The present subject matter includes embodiments in which the battery 104 is a secondary battery that is rechargeable. Various secondary battery chemistries are contemplated, including lithium ion battery chemistries. Lithium ion chemistries include, but are not limited to, lithium iron phosphate, lithium cobalt oxide and other lithium metal oxides, and other chemistries. Additional battery chemistries include, but are not limited to, nickel metal hydride chemistries, lead acid chemistries, nickel cadmium chemistries and other chemistries.

In some examples, the battery 104 includes a plurality of lithium ion cells coupled in parallel and/or series. Some examples include cylindrical lithium ion cells. In certain examples, the battery 104 includes one or more cells compatible with the 18650 battery standard, which is about 18 millimeters in diameter and about 65 millimeters in length, but the present subject matter is not so limited. Some examples include a first plurality of cells connected in parallel to define a first brick of cells, with a second plurality of cells connected in parallel to define a second brick of cells, with the first brick and the second brick connected in series. Some examples connect 69 cells in parallel to define a brick. Battery voltage, and as such, brick voltage, often ranges from around 3.6 volts to about 4.2 volts in use. In part because the voltage of batteries ranges from cell to cell, some instances include voltage management systems to maintain a steady voltage. Some embodiments connect 9 bricks in series to define a sheet. Such a sheet has around 35 volts. Some instances connect 11 sheets in series to define the battery of the ESS. The ESS will demonstrate around 385 volts in various examples. As such, some examples include approximately 6,831 cells that are interconnected.

Additionally illustrated is an energy converter 108. The energy converter includes the PEM in some examples. The energy converter 108 is part of a system which converts energy from the vehicle propulsion battery 104, including any related components such as those associated with the ESS, into energy useable by the at least one electric motor 106. In certain instances, the energy flow is from the at least one electric motor 106 to the vehicle propulsion battery 104. As such, in some examples, the vehicle propulsion battery 104 transmits energy to the energy converter 108, which converts the energy into energy usable by the at least one electric motor 106 to propel the electrical vehicle. In additional examples, the at least one electric motor 106 generates energy that is transmitted to the energy converter 108. In these examples, the energy converter 108 converts the energy into energy which can be stored in the vehicle propulsion battery 104. In certain examples, the energy converter 108 includes transistors. Some examples include one or more field effect transistors. Some examples include metal oxide semiconductor field effect transistors. Some examples include one more insulated gate bipolar transistors. As such, in various examples, the energy converter 108 includes a switch bank which is to receive a direct current ("DC") power signal from the vehicle propulsion battery 104 and to output a three-phase alternating current ("AC") signal to power the vehicle electric motor 106. In some examples, the energy converter 108 is to convert a three phase signal from the vehicle electric motor 106 to DC power to be stored in the vehicle propulsion battery 104. Some examples of the energy converter 108 convert energy from the vehicle propulsion battery 104 into energy usable by electrical loads other than the vehicle electric motor 106. Some of these examples switch energy from approximately 390 Volts DC to 14 Volts DC.

The electric motor 106 is, in some embodiments, a three phase alternating current ("AC") electric motor. Some examples include a plurality of such motors. The present subject matter can optional include a transmission or gearbox 110 in certain examples. While some examples include a 1-speed transmission, other examples are contemplated. Manually clutched transmissions are contemplated, as are those with hydraulic, electric, or electrohydraulic clutch actuation. Some examples employ a dual-clutch system that, during shifting, phases from one clutch coupled to a first gear to another coupled to a second gear. Rotary motion is transmitted from the transmission 110 to wheels 112 via one or more axles 114, in various examples.

A vehicle management system ("VMS") 116 is optionally provided to control one or more of the vehicle propulsion battery 104 and the energy converter 108. In certain examples, the vehicle management system 116 is coupled to vehicle system which monitors a safety system such as a crash sensor. In some examples the vehicle management system 116 is coupled to one or more driver inputs, such as acceleration inputs. The vehicle management system 116 is to control power to one or more of the vehicle propulsion battery 104 and the energy converter 108, in various embodiments.

External power 118 is provided to communicate energy with the vehicle propulsion battery 104, in various examples. In various embodiments, external power 118 includes a connector that is coupled to a municipal power grid. In certain examples, the charging converts power from an 110V AC power source into power storable by the vehicle propulsion battery 104. In some examples, such conversion is performed by components onboard of a vehicle. In additional examples, the connector converts power from a 120V AC power source into power storable by the vehicle propulsion battery 104. Some embodiments include converting energy from the battery 104 into power usable by a municipal grid. The present subject matter is not limited to examples in which a converter for converting energy from an external source to energy usable by the vehicle 100 is located outside the vehicle 100, and other examples are contemplated.

Some examples include a vehicle display system ("VDS") 126. The vehicle display system 126 includes a visual indicator of system 100 information in some examples. In some embodiments, the vehicle display system 126 includes a monitor that includes information related to system 100. The vehicle display system can include a user interface relating to battery preheating as disclosed herein.

Figure 2:
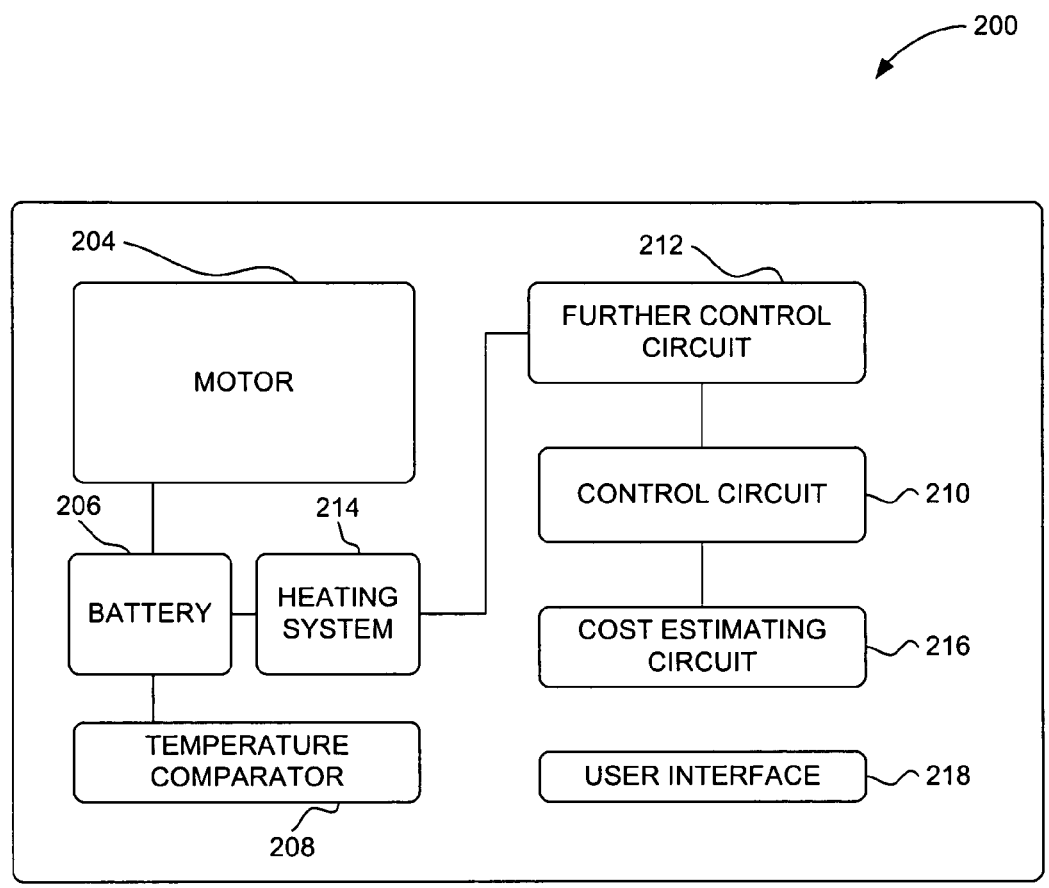
FIG. 2 is a diagram of a system, according to some embodiments.

FIG. 2 is a diagram of a system 200, according to some embodiments. The system 200 is for preheating one or more vehicle propulsion batteries before they are used. In some embodiments preheating includes transferring heat from a heater to a battery. In additional examples, preheating includes deactivating a cooling system so that batteries are no longer cooled and therefore heat. In some of these examples, batteries can gather heat via internal heating, such as during charging. In additional examples, batteries can collect heat from an ambient source, such as from atmosphere. Some examples cool a motor and a battery with a fluid cooling system, and in these examples the battery can be heated by circulating fluid from the motor to the battery. In some examples, the fluid is circulated without further thermal adjustment via heating or refrigeration.

In various embodiments, the system 200 is for heating vehicle propulsion batteries during their use. The present system can operate to preheat batteries while they are being charged in some examples. The present system optionally can heat batteries by deactivating a battery cooling system during charging. In additional examples, the system 200 preheats batteries independent of whether they are being charged. The system 200 can be a stand alone system, or can be integrated with one or more of the systems detailed FIG. 1 and the associated discussions of FIG. 1.

Various embodiments include a battery temperature comparator 208 to monitor temperature of the battery. In various embodiments, the battery temperature comparator 208 is to compare a temperature of the battery to a target preheated temperature and to provide a battery below temperature signal when the battery temperature is below a target preheated temperature. In some embodiments, the battery temperature comparator 208 includes an impedance sensing circuit to measure the temperature of the battery by sensing its impedance. Thermocouples and other known temperature monitoring circuits are additionally contemplated.

The battery temperature comparator 208 can report the battery below temperature signal in various ways. In some examples, the battery temperature comparator 208 constantly outputs a battery below temperature signal. In additional examples, the battery below temperature signal is output intermittently.

Various embodiments include a control circuit 210. In various examples, the control circuit 210 is to determine the time remaining prior to a scheduled drive start time. In some examples, the control circuit is to provide a preheating enable signal during a target time interval prior to the scheduled drive start time.

In various embodiments, the control circuit 210 is to determine a scheduled drive start time. The control circuit 210 can be preprogrammed with a scheduled drive start time in some embodiments. In additional embodiments, the control circuit 210 determines the scheduled drive start time by recording a plurality of historical drive start times and calculating the scheduled drive start time based on the plurality of historical drive start times. In some examples, this includes statistical analysis of the plurality of actual driving start times. For example, some embodiment recognize that a vehicle user departs on a daily commute at 8:00 AM for a number of weekdays, and estimates that a vehicle will begin a driving on an upcoming weekday at 8:00 AM. Some embodiments recognize that it is not a weekday and disable battery preheating during weekend days.

In some embodiments, the control circuit 210 is to determine a preheating time interval prior to a scheduled drive start time. As disclosed herein, some embodiments do not begin preheating until a time interval that is a minimum amount of time prior to a scheduled drive start time is reached. In some examples, this minimum amount of time is the time required to constantly preheat a battery to reach a preheating temperature without maintaining the battery at a constant preheat temperature. In this example and others, the control circuit 210 provides a preheating enable signal during this minimum amount of time.

Various embodiments include a further control circuit 212 coupled at least to the control circuit 210 and the heating system 214. The heating system 214 can include any heat emitting device, including, but not limited to, resistive devices and other devices. Some embodiments contemplated are described in U.S. patent application Ser. No. 11/786,108, entitled "Electric Vehicle Thermal Management System", filed Apr. 11, 2007, which is commonly assigned and incorporated herewith in its entirety. In various embodiments, the heating system 214 is coupled to the further control circuit 212 to preheat the battery 206 in response to the battery below temperature signal. In additional examples, the further control circuit 212 is to preheat the battery in response to the preheating enable signal. In various embodiments, the heating system 214 is part of a heating, ventilation and air conditioning system adapted to control climate in a cabin of the electrical vehicle and the liquid in a liquid heating/cooling system for an ESS. Battery heating refers to the heating/cooling of the liquid to adjust the battery temperature to a hotter temperature or to a cooler temperature.

Figure 6:
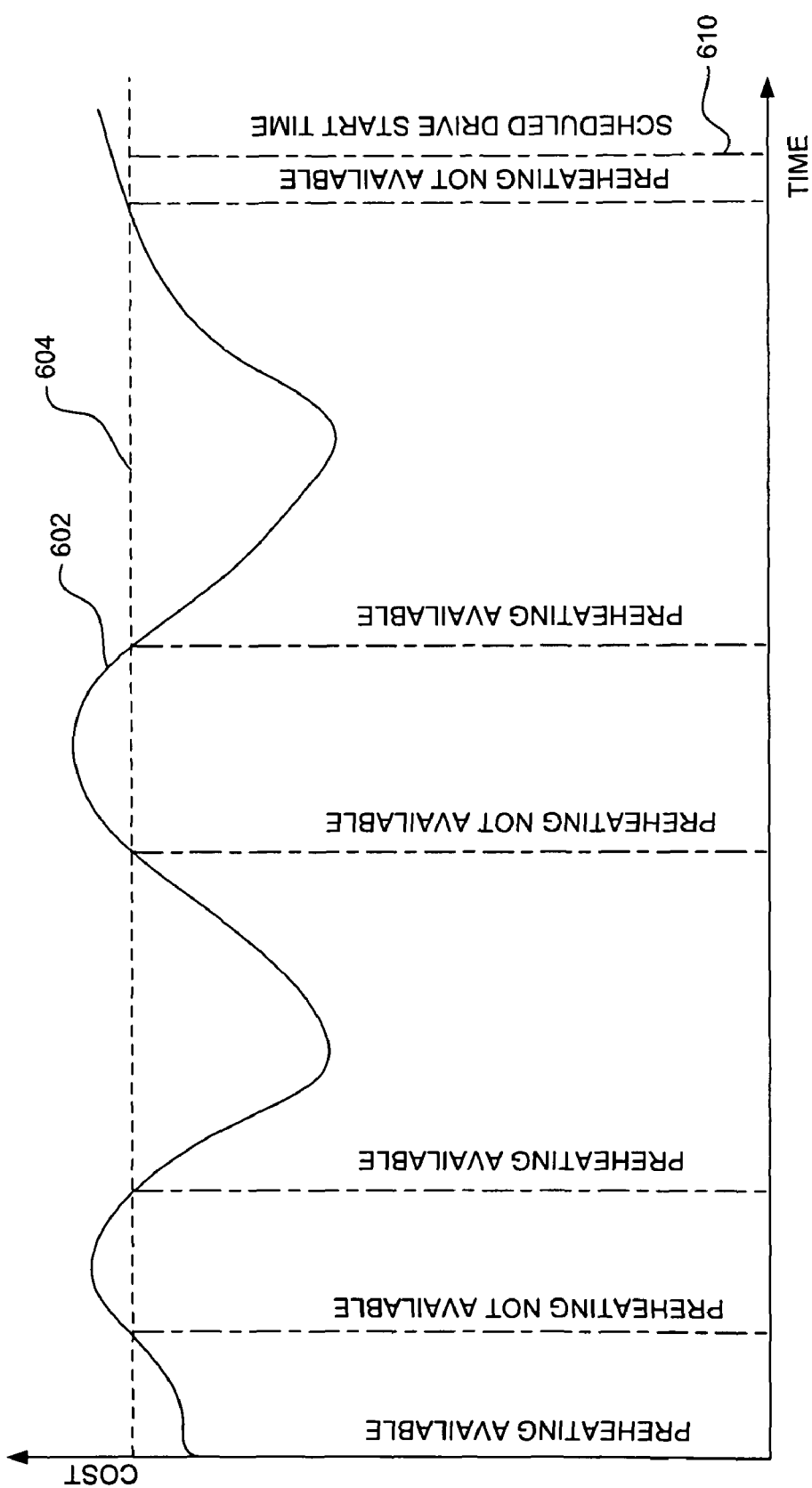
FIG. 6 is a diagram showing energy cost over time corresponding with battery preheating, according to some embodiments.

Various embodiments include a cost estimating circuit 216 coupled to the control circuit 210. In various embodiments, the cost estimating circuit 216 is to monitor an energy cost factor for operating the preheating system. In various embodiments, cost information is available to the control circuit 210. The cost information is estimated based on pre-programmed data in some embodiments. In some embodiments, the cost information is provided by an external source, such as a municipal power grid or another power grid. The cost factor can include instantaneous cost, a cost rate, or other cost identifiers. In various embodiments, the cost estimating circuit 216 is to compare the energy cost factor to a specified energy cost factor. In various examples, the control circuit 210 provides the preheating enable signal only while the energy cost factor is below a specified energy cost factor. FIG. 6 and the portions of this document that discuss that figure demonstrate one example of the operation of the cost estimating circuit 216 in relation to the other components described herein.

The further control circuit 212 provides a battery preheating signal using software, in some examples. Such software is programmed into the further control circuit 212 in some embodiments. Additional embodiments use firmware. Still further embodiments use hardware configurations. Some embodiments include mechanical switches to provide the battery preheat signal. Additional embodiments include solid-state devices that control providing the battery preheat signal.

User interface 218 is used to collect a user input in some embodiments. The user interface 218 can optionally display information to a user. Embodiments are of user interface 218 are discussed in FIG. 4 and the portions of this document discussing that figure.

Hardware and Operating Environment

This section provides an overview of example hardware and the operating environments in conjunction with which embodiments of the inventive subject matter can be implemented.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. Thus, other embodiments may be realized, as discussed regarding FIG. 3 below.

Figure 3:
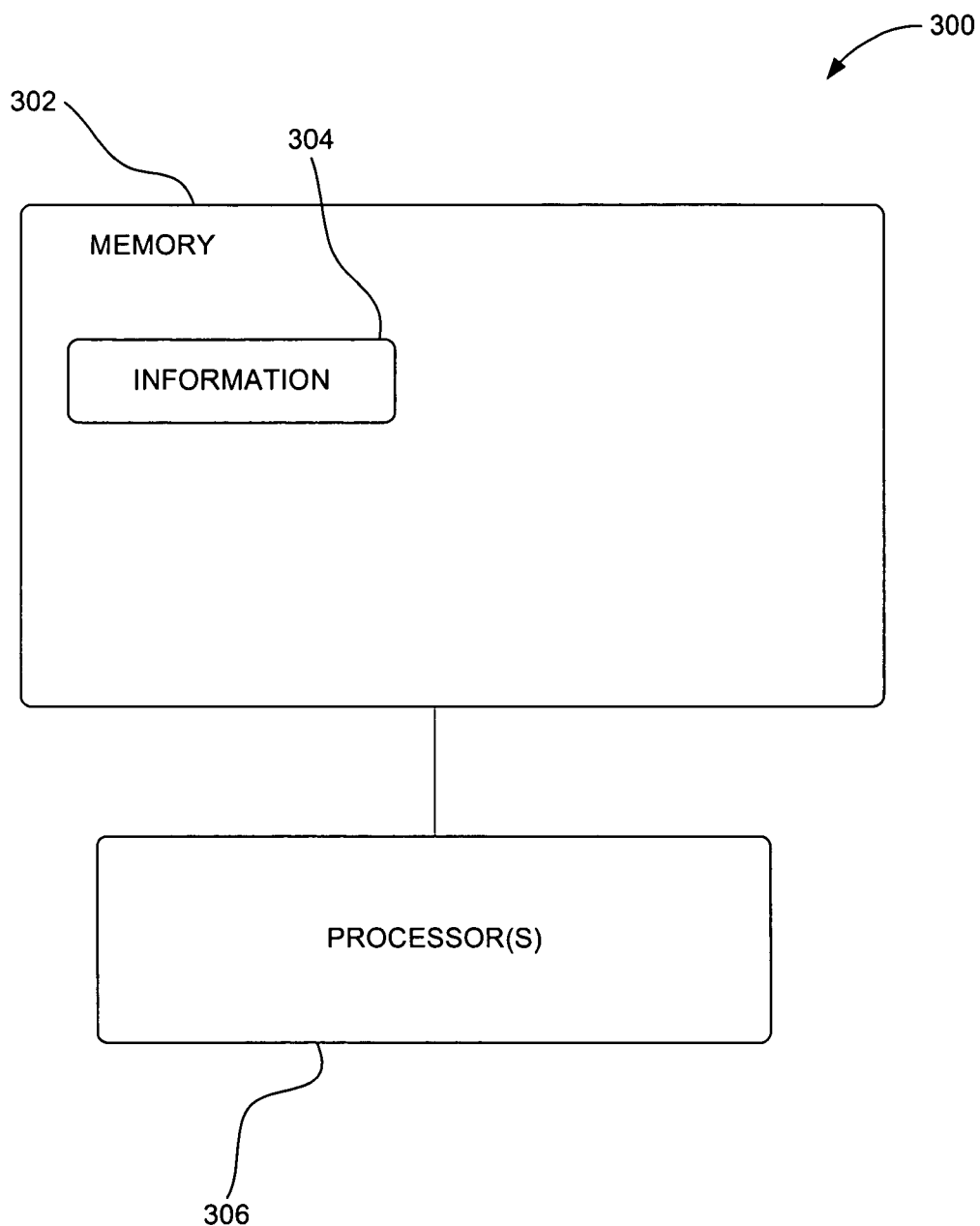
FIG. 3 is a diagram of an article according to various embodiments of the invention.

FIG. 3 is a block diagram of an article 300 according to various embodiments of the present subject matter. Such embodiments may comprise a computer, a memory system, a magnetic or optical disk, certain other storage device, or any type of electronic device or system. The article 300 may include one or more processor(s) 306 coupled to a machine-accessible medium such as a memory 302 (e.g., a memory including electrical, optical, or electromagnetic elements). The medium may contain associated information 304 (e.g., computer program instructions, data, or both) which, when accessed, results in a machine (e.g., the processor(s) 306) performing the activities described herein.

Figure 4:
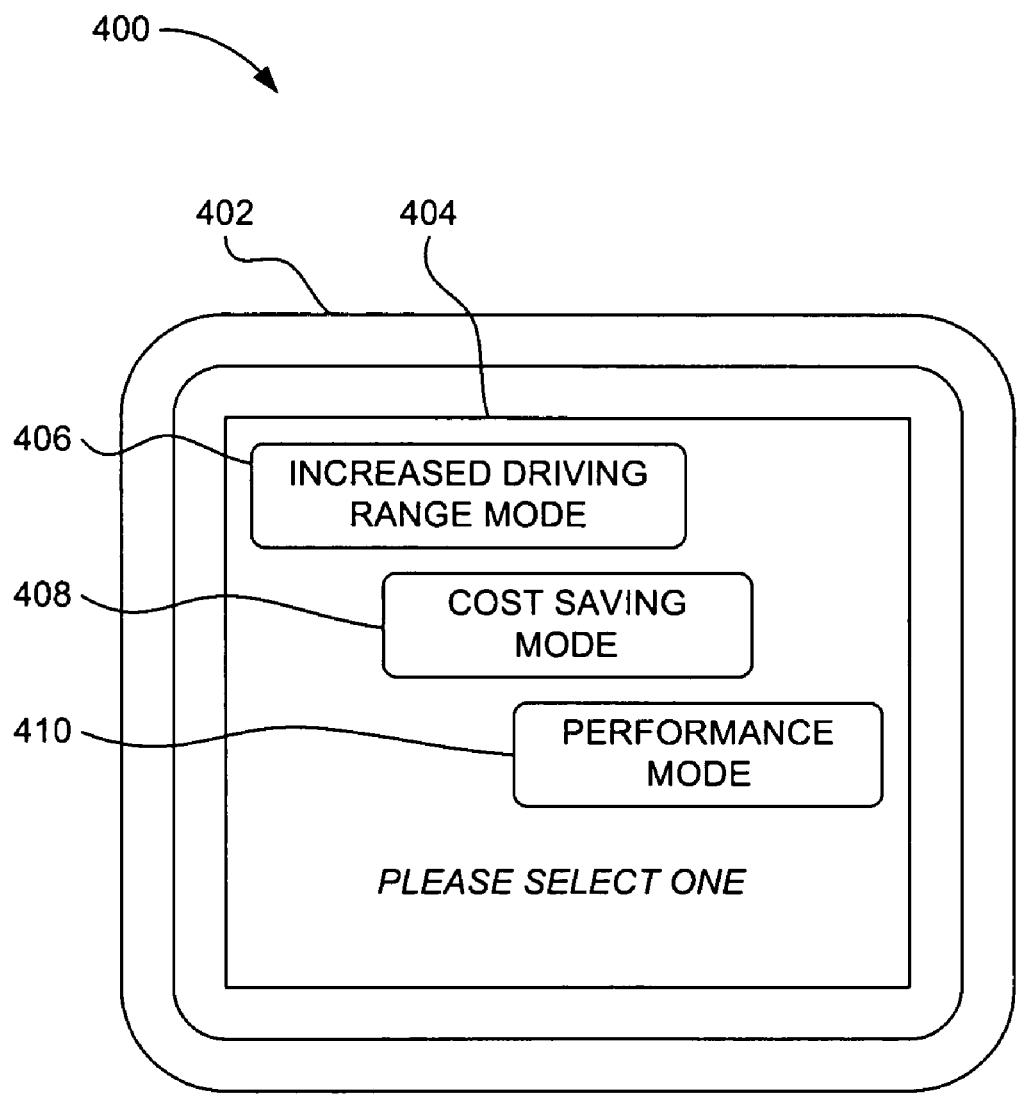
FIG. 4 is an illustration of a user input, according to some embodiments.

FIG. 4 is an illustration of a user interface, according to some embodiments. In some examples, the user interface 400 is coupled to the vehicle. In some of these examples, the user interface 400 is a display screen visible to a vehicle operator. In these examples, the user interface 400 includes a graphical display and uses graphical inputs and outputs to communicate information. In some of these embodiments, the user interface 400 is accessible from a cabin of the vehicle.

Additional embodiments include a user interface 400 that receives information coded into an electronic signal. As such, the user interface 400 is a module hidden from the user, in some examples. For example, the user interface 400 could communicate over an on board diagnostics terminal. Some embodiments communicate via control circuit area network ("CAN") communications, but the present subject matter is not so limited. In some embodiments, the user interface 400 is an automotive dealership-based tool that communicates via wired or wireless communications with a vehicle. Embodiments that communicate over the internet are additionally contemplated. For example, in some embodiments, the user interface 400 communicates with a home wireless network.

The illustrated embodiment of user interface 400 includes a housing 402 and a screen 404. In various embodiments, the user interface stores a user input. In some examples, the user interface 400 is coupled to a control circuit to store a user input. In some of these embodiments, the control circuit provides preheating enable signal based on the user input. The preheating enable signal can be specified automatically in some embodiments. In additional embodiments, a preheating time interval signal is not provided until a user input is recorded. Some embodiments include a default preheating enable signal that is provided automatically.

In various embodiments, the user interface 400 is to provide a plurality of options, with the user input being a selection of one of the options. For example, according to one option, the user interface 400 allows a user to deactivate the preheating system. In an additional example, the user interface 400 modifies the target preheated temperature based on a user input. In an additional example, the user interface 400 modifies the target preheated temperature to a modified target preheated temperature associated with a specified minimum impedance of the battery.

Illustrated are an increased driving range mode 406, a cost saving mode 408, and a performance mode 410. These modes are selected via depression of buttons in some examples. Buttons can be graphical buttons as part of a touch-screen interface. In additional examples, they can be toggle switches, moment buttons with associated indicators (such as illuminating lamps), or other devices compatible with storing a user selection. Although the present example illustrates three modes, the present subject matter is not so limited.

Additional examples include an improved cycle life mode. Still further examples include a storage mode. The increased driving range mode, cost saving mode, performance mode, improved cycle life mode, and storage mode each represent individual modes in which the vehicle preheats a battery according to different methods. Methods can include algorithms.

Figure 5:
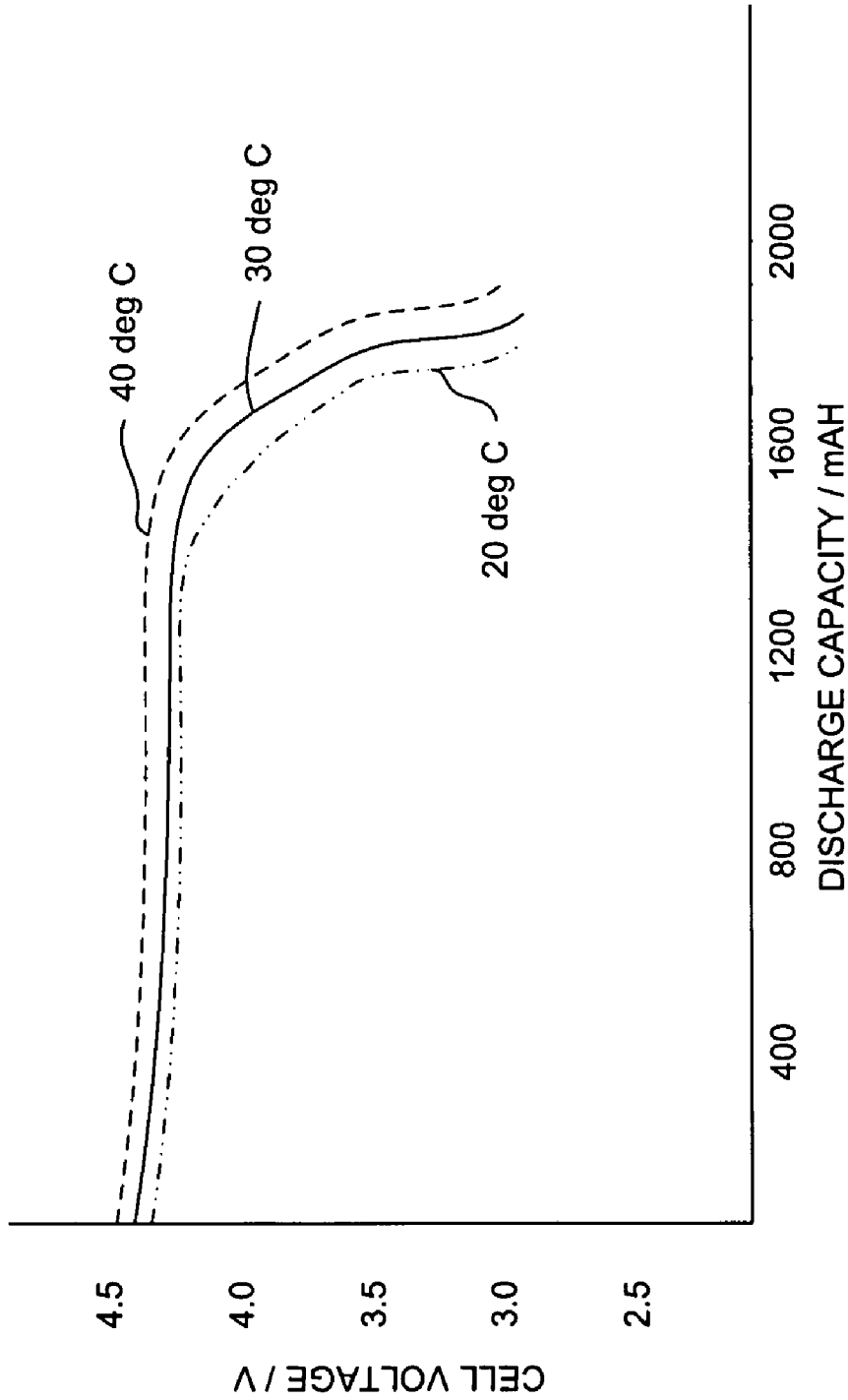
FIG. 5 is a diagram showing cell voltage versus discharge capacity of an example battery over various temperatures, according to some embodiments.

FIG. 5 is a diagram showing cell voltage versus discharge capacity of an example battery over various temperatures, according to some embodiments. The diagram is provided for illustration and is does not correspond to an actual battery. The present subject matter is configurable to various battery chemistries. In some embodiments, a control circuit, a user interface, or another portion of a vehicle is preprogrammed with information based on the illustrated graph. Some examples compile the illustrated graph using data collected during driving.

According to the increased driving range mode, the system improves the driving distance a vehicle is capable of. The graph illustrates that as steady state temperature of the illustrated battery pack is increased from 20 degrees Celsius to 40 degrees Celsius, discharge capacity is increased. The present system can be preprogrammed to select a battery preheating temperature which corresponds with improved discharge capacity. Additional examples provide improved discharged rates. In some examples, either or both of improved discharge capacity and improved discharge rate are caused by a reduction in impedance. Improved discharge rate leads to faster vehicle acceleration. Improved discharge capacity leads to an increase in driving range. This selection is used by the control circuit or another component to determine a battery preheating time interval. Longer battery preheating time intervals result in higher battery temperatures. The present subject matter can additionally adjust heating rate, in some embodiments. In various embodiments, if a user selects an increased driving range mode, the system will preheat the battery to a preprogrammed temperature which improves discharge capacity. In some examples, the system would preheat the batteries to 40 degrees Celsius. In additional examples, the present subject matter would deactivate a battery cooling system such that the battery temperature increases, such as by heat flow from an ambient source or by heat generated by charging. In optional embodiments, the present subject matter is adapted to learn which temperature provides an improved discharge capacity. This can be by monitoring the temperature of the ESS and comparing it with a look-up table showing which temperature provides optimal discharge capacity (e.g., the data represented in FIG. 5).

FIG. 6 is a diagram showing energy cost over time corresponding with battery preheating. The diagram is provided for illustration and is does not correspond to actual information. According to the cost saving mode, the system reduces the costs associated with operating a vehicle. In various embodiments, the system will not preheat batteries unless a specified cost criterion is met. For example, the time intervals labeled "preheating available" illustrate time intervals during which battery preheating is available. In these examples, the cost information 602 is above a specified energy cost 604. The time intervals labeled "preheating not available" indicate that battery preheating is not cost effective and therefore not available. Other modes can use the information of FIG. 6 and choose to preheat the battery based on cost criteria in addition to other criteria. Some cost saving modes rely solely on the information of FIG. 6. Additional cost saving modes incorporate additional variables to preheat the battery. Battery preheating occurs before scheduled drive start time 610, according to various embodiments.

Figure 7:
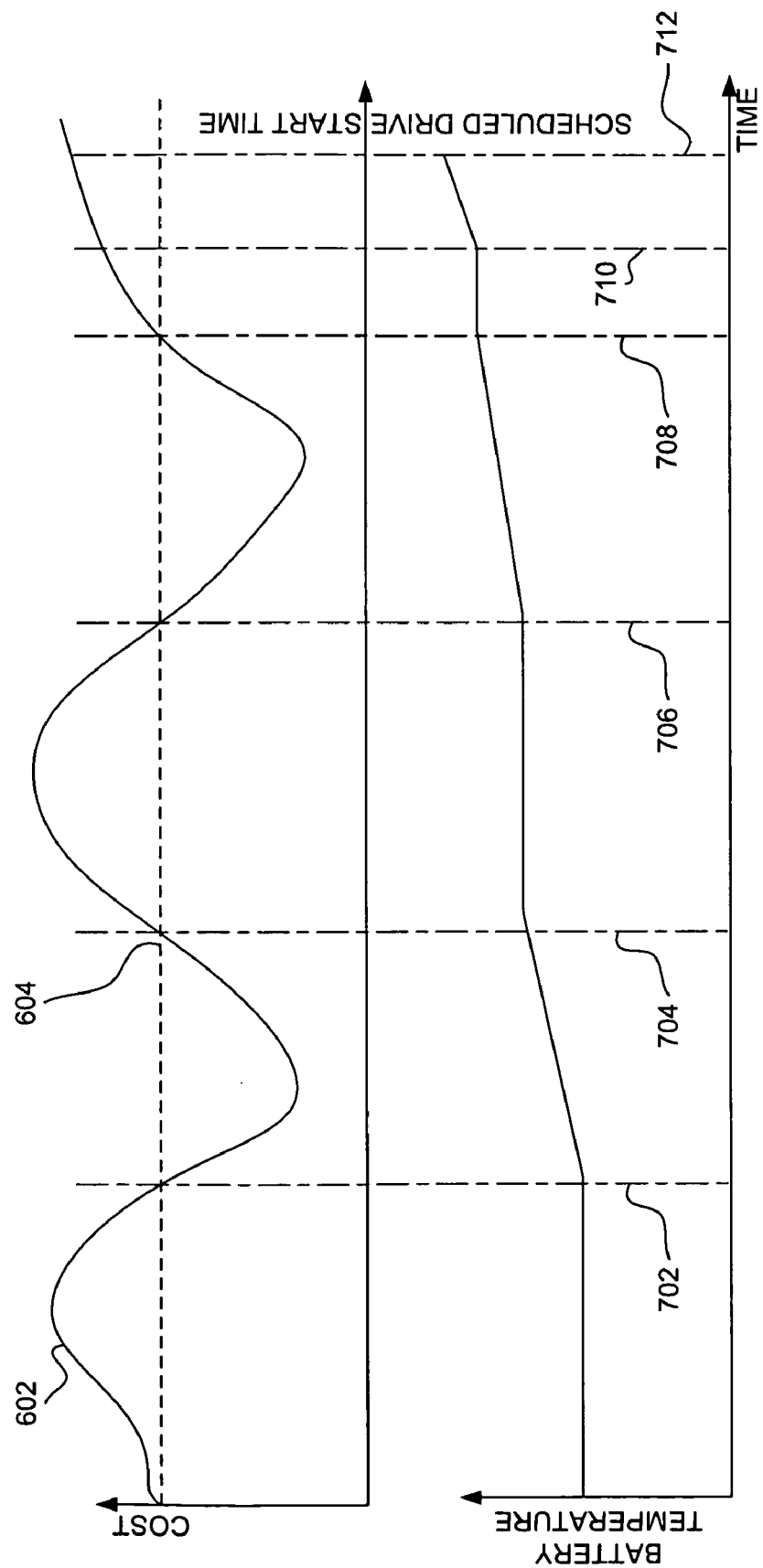
FIG. 7 is a diagram showing energy cost over time corresponding with battery preheating, according to some embodiments.

FIG. 7 is a diagram showing energy cost over time corresponding with battery preheating, according to some embodiments. In some cost saving modes, battery preheating is not available during the time interval ending at 702. This is because the cost information 602 indicates that cost is above the specified energy cost 604. During the time interval ending at 704, battery preheating is available, and battery temperature increases. A linear increase in battery temperature is possible in some embodiments, while additional embodiments demonstrate a nonlinear increase in battery temperature. During the time interval ending at 706, battery temperature is constant or decreases slightly as battery preheating is not available. During the time interval ending at 708, battery preheating again occurs. During the time interval ending at 710, the illustrated embodiment recognizes that a minimum amount of time needed to reach a desired battery preheat temperature has been reached, and begins preheating, even though the cost information 602 indicates a cost above the specified energy cost 604. This is because the system desires to reach a preheating temperature irrespective of cost constraints. Other modes disclosed herein can incorporate cost information and override such cost information to reach other performance criteria. During the time interval staring at 710, the battery in the illustrated example is preheated continuously until the scheduled drive start time 712 is reached.

In various embodiments, if the car does not start driving at 712, some embodiments maintain battery preheat temperature for a specified time based on the cost information 602, preheating only when cost is below the specified energy cost 604. In additional embodiments, battery preheating does not occur after the scheduled drive start time 712. In still further embodiments, battery preheat is maintained even if the cost information 602 indicates a cost above the specified energy cost 604.

Figure 8:
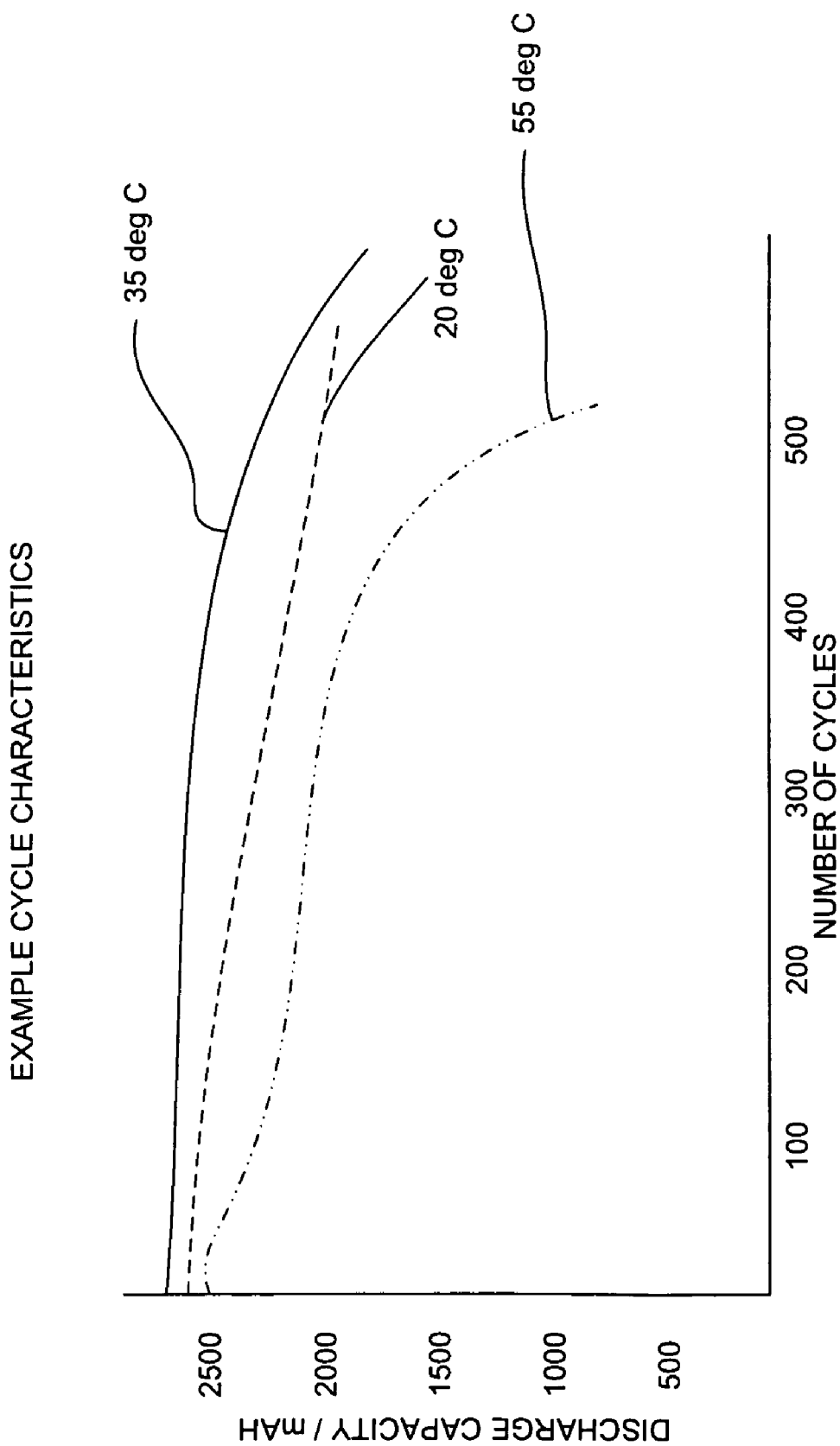
FIG. 8 is a diagram showing discharge capacity versus the number of charge cycles of an example battery over various temperatures, according to some embodiments.

FIG. 8 is a diagram showing discharge capacity versus the number of charge cycles of an example battery over various temperatures, according to some embodiments. The diagram is provided for illustration and is does not correspond to an actual battery. The present subject matter is configurable to various battery chemistries. In some embodiments, a control circuit, a user interface, or another portion of a vehicle is preprogrammed with information based on the illustrated graph.

The diagram illustrates that the number of cycles a battery can be charged without a reduction in performance is higher at 35 degrees Celsius than at 55 degrees Celsius or 20 degrees Celsius. As such, according to a cycle life mode based on performance data, the system preheats the battery to 35 degrees Celsius to improve the number of charge and discharge cycles that one or more batteries can be charged and discharged through during the lifetime of the one or more batteries. In some examples, preheating is not needed if another heat source, such as heat from the environment or heat generated internal to the battery is available. In some of these examples, a battery cooling system is deactivated to heat the battery.

Figure 9:
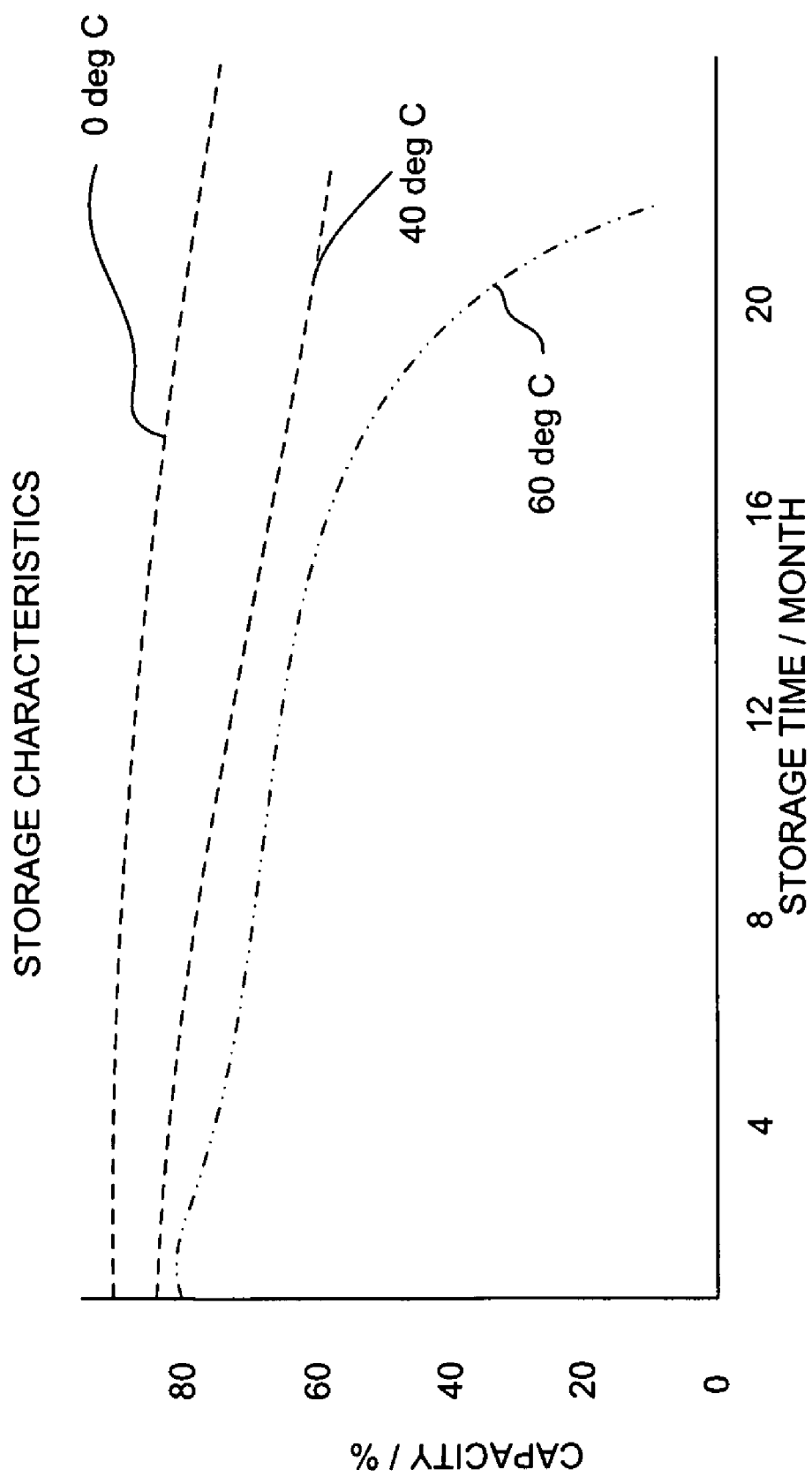
FIG. 9 is a diagram showing battery capacity versus storage time of an example battery over various temperatures, according to some embodiments.

FIG. 9 is a diagram showing battery capacity versus storage time of an example battery over various temperatures, according to some embodiments. The diagram is provided for illustration and is does not correspond to an actual battery. The present subject matter is configurable to various battery chemistries. In some embodiments, a control circuit, a user interface, or another portion of a vehicle is preprogrammed with information based on the illustrated graph.

In some examples, the batteries are able to be charged and discharged for a longer period of time (e.g. years) at 0 degrees Celsius than at a higher temperature. In these examples, the longer they are kept at such a temperature the longer they can remain useful in vehicular applications. According to the storage mode at low temperature, the system improves the ability of the batteries to maintain capacity during construction, transportation, inventory, repair and other vehicles uses not related to the end user's driving and otherwise operating the vehicle. In other words, the mode improves battery lifetime. In the example, the battery is maintained at 0 degrees Celsius to improve capacity. In some examples, if the ambient temperature is sensed to be near the set storage temperature, battery preheating is deactivated or battery cooling is activated. Various embodiments provide an indicator to indicate that a vehicle is in storage mode. Such an indicator can be an illuminated lamp, in some embodiments. In additional embodiments, the indicator includes an electronic signal, such as a signal communicated via wired or wireless communications.

According to a performance mode, the system improves the power available to the vehicle so that the vehicle can be used in high performance driving. In some examples, lower impedance enables higher performance driving. In some examples, the system measures battery impedance over a plurality of battery temperatures and preheats the battery to a temperature that corresponds to a minimum impedance. Such a minimum can be predicted using curve-fitting in some embodiments. In additional embodiments, the minimum is determined on specified information, such as a factory recommended minimum impedance. Some embodiments maintain the batteries at a temperature corresponding to a minimum impedance during the driving of the vehicle.

Impedance is not measured in some examples including a performance mode. For example, some embodiments include a specified target preheat temperature that is associated with performance, and the present subject matter controls temperature of a battery system to match the specified target preheat temperature. In some examples, a maximum performance temperature is equivalent to a maximum driving range temperature, but the present subject matter is not limited to such examples.

The modes discussed herein can be used in combination. For example, each of the increased driving range mode, the cycle life mode, the performance mode and the storage mode can additionally be combined with the cost saving modes associated with FIGS. 7-8.

Figure 10:
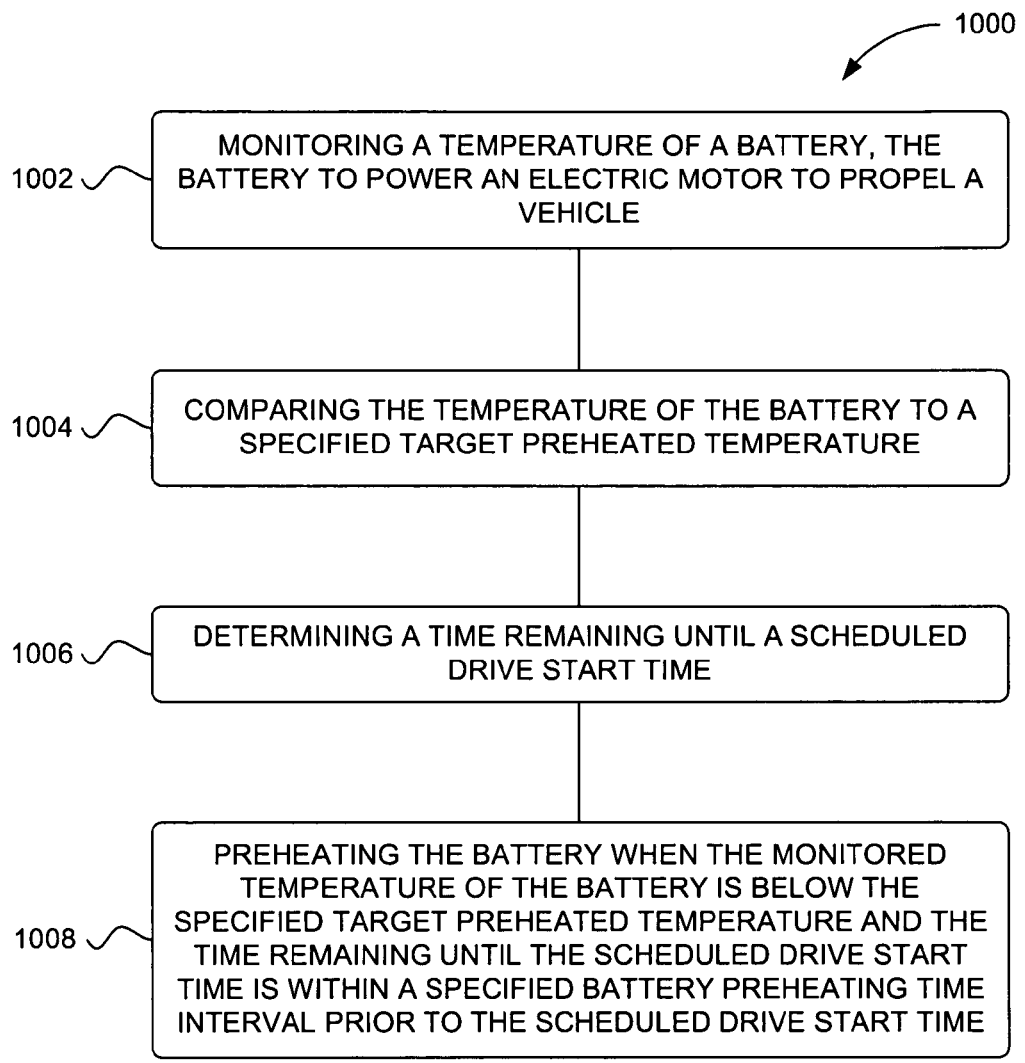
FIG. 10 is flow diagram illustrating a method, according to some embodiments.

FIG. 10 is flow diagram illustrating a method 1000, according to some embodiments. Various embodiments include, at 1002, monitoring a temperature of a battery, the battery to power an electric motor to propel a vehicle. Additional embodiments include, at 1004, comparing the temperature of the battery to a specified target preheated temperature. Various embodiments include, at 1006, determining a time remaining until a scheduled drive start time. Embodiments include, at 1008, preheating the battery when the monitored temperature of the battery is below the specified target preheated temperature and the time remaining until the scheduled drive start time is within a specified battery preheating time interval prior to the scheduled drive start time.

Figure 11:
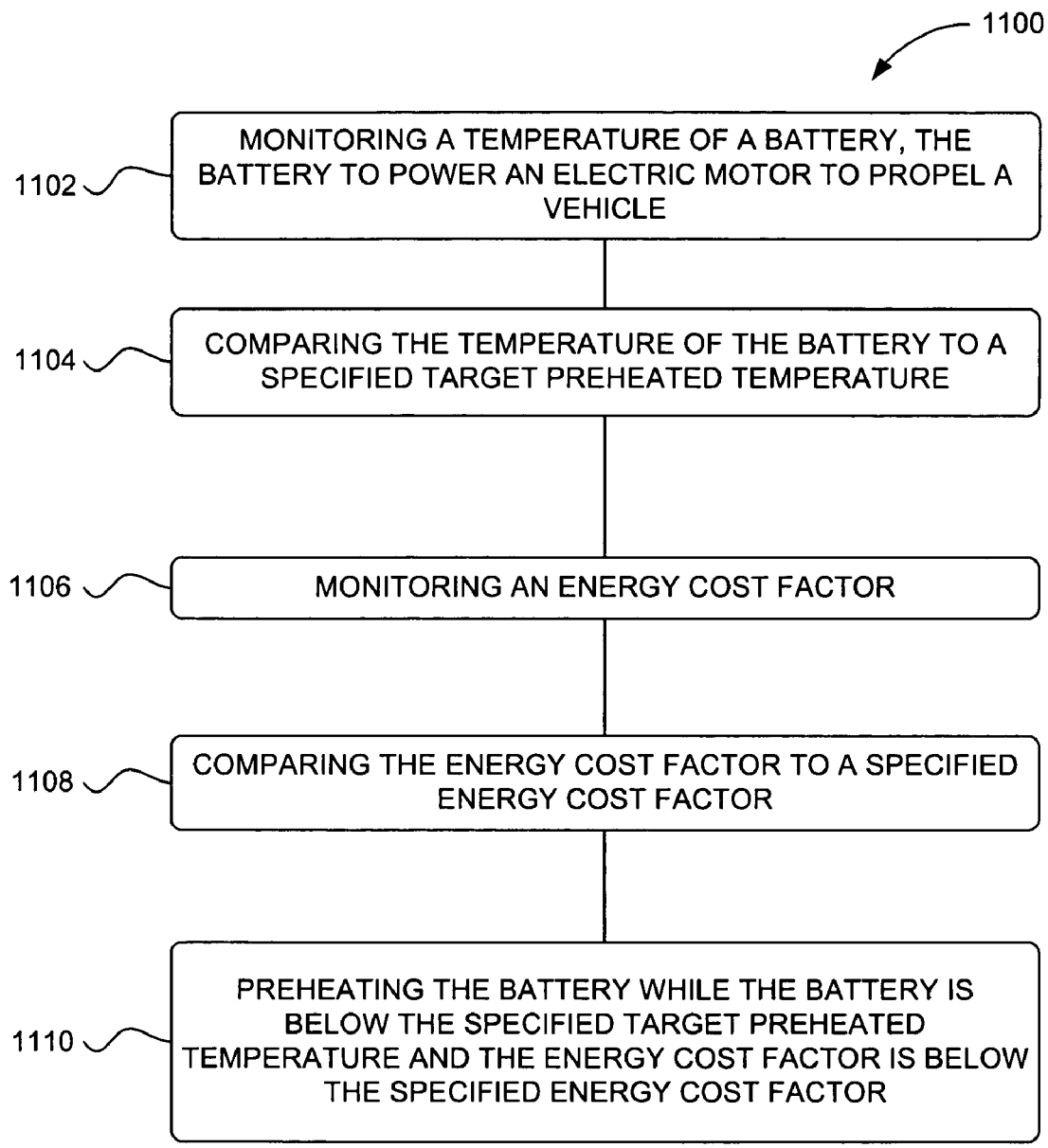
FIG. 11 is flow diagram illustrating a method, according to some embodiments.

FIG. 11 is flow diagram 1100 illustrating a method, according to some embodiments. Various embodiments include, at 1102, monitoring a temperature of a battery, the battery to power an electric motor to propel a vehicle. Some embodiment include, at 1104, comparing the temperature of the battery to a specified target preheated temperature. Various embodiments include, at 1106, monitoring an energy cost factor. Some embodiments include, at 1108, comparing the energy cost factor to a specified energy cost factor. Some embodiments include, at 1110, preheating the battery while the battery is below the specified target preheated temperature and the energy cost factor is below the specified energy cost factor.

Various optional methods are possible. Some embodiments include polling a user via a user interface for a user input selecting one of a first mode associated with the temperature of the battery, and a second mode associated with the specified temperature. Some of these embodiments include preheating the battery to the specified temperature only when the second mode is selected. Some of these embodiments include indicating to the user interface a risk of calendar life decrease when a mode that does not selection a specified temperature that corresponds with maximum calendar life.

Various embodiments include storing a user input to enter a vehicle storage mode and comparing the temperature of the battery to a target storage temperature and continuously controlling battery to the storage temperature if the temperature does not match the target storage temperature. Some of these embodiments include indicating a storage mode to the user interface. Some embodiments include deactivating a cooling system when a battery temperature is above a specified target preheating temperature.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

What is claimed is:

1. A system, comprising:
    an electric motor coupled to propel an electrical vehicle; a battery coupled to power the motor;
    a temperature control system coupled to control temperature of the battery;
    a battery temperature comparator to compare a temperature of the battery to a specified target storage temperature and to a specified target preheated temperature that is higher than the specified target storage temperature, and to provide a battery below storage temperature signal when the battery temperature is below the specified target storage temperature, and to provide a battery below preheated temperature signal when the battery temperature is below the specified target preheated temperature;
    a control circuit to determine a time remaining prior to a scheduled drive start time and to provide a preheating enable signal during a target time interval prior to the scheduled drive start time; and
    a further control circuit to operate the temperature control system to control the temperature of the battery in response to the battery below storage temperature signal to maintain the battery temperature at the specified target storage temperature, and alternately to preheat the battery in response to the battery below preheated temperature signal and the preheating enable signal.

2. The system of claim 1, wherein the further control circuit is to deactivate a battery cooling system in response to the battery below temperature signal and the preheating enable signal.

3. The system of claim 1, further comprising a user interface coupled to deactivate the preheating system in response to a user input.

4. The system of claim 3, wherein the user interface is to modify the specified target preheated temperature based on a user input.

5. The system of claim 4, wherein the user interface is to modify the specified target preheated temperature to a modified target preheated temperature associated with a specified minimum impedance of the battery associated with a specified maximum discharge rate.

6. The system of claim 4, wherein the user interface is to modify the specified target preheated temperature to correspond to a modified target preheated temperature associated with a specified maximum discharge capacity.

7. The system of claim 4, wherein the user interface is to modify the target preheated temperature to correspond to a modified target preheated temperature associated with a specified maximum cycle life.

8. The system of claim 1, further comprising a cost estimating circuit coupled to the control circuit to monitor an energy cost factor for operating the preheating system and to compare the energy cost factor to a specified energy cost factor, wherein the control circuit provides the preheating enable signal only while the energy cost factor is below the specified energy cost factor.

9. The system of claim 8, wherein the cost estimating circuit is to record a plurality of actual energy cost factors to calculate the specified energy cost factor based on the recorded actual energy cost factors.

10. The system of claim 1, wherein the battery temperature comparator is to monitor ambient temperature, and to provide the battery below storage temperature signal when the specified target storage temperature is below ambient temperature.

11. The system of claim 10, wherein the further control circuit is to deactivate a battery cooling system when an ambient temperature is above the specified target storage temperature.

12. The system of claim 1, wherein the battery temperature comparator is to monitor ambient temperature, and to provide the battery below preheated temperature signal when the specified target preheated temperature is below ambient temperature.

13. The system of claim 12, wherein the further control circuit is to deactivate a battery cooling system when ambient temperature is above the specified target preheated temperature.

14. The system of claim 1, wherein the control circuit is to record a plurality of historical drive start times and to calculate the scheduled drive start time based on the plurality of historical drive start times.

15. The system of claim 1, wherein the temperature control system includes a fluid circuit coupled to a heating, ventilation and air conditioning system of the vehicle and the battery to transfer heat between the heating, ventilation and air conditioning system and the battery.

16. The system of claim 1, wherein the battery temperature comparator is to provide the battery below preheated temperature signal in a first mode of operation, and in a second mode of operation other than the first mode, the further control circuit is to control the temperature control system to cycle battery temperature through a specified range of operating temperatures to determine a minimum battery impedance measured over the specified range at minimum impedance temperature, and the battery temperature comparator s to compare the temperature of the battery to a specified target minimum impedance temperature and to provide the battery below preheated temperature signal with the battery temperature is below the specified target minimum impedance temperature.

17. The system of claim 16, further including a display, wherein the battery temperature comparator is to display the specified target minimum impedance temperature to the display while operating in the second mode of operation.

18. The system of claim 17, wherein the display is part of a user interface to select between the first mode and the second mode.

19. The system of claim 1, further comprising a cost estimating circuit coupled to the control circuit to monitor an energy cost factor for operating the preheating system and to compare the energy cost factor to a specified energy cost factor, wherein the control circuit provides the preheating enable signal while the energy cost factor is below the specified energy cost factor unless the time remaining until the scheduled drive start time is within a specified battery preheating time interval prior to the scheduled drive start time, in which case the control circuit provides the preheating enable signal independent of comparison of the energy cost factor to the specified energy cost factor.

20. The system of claim 1, wherein the specified target preheated temperature is associated with a maximum battery lifetime temperature.

21. The system of claim 1, wherein the specified target preheated temperature is associated with a maximum cycle life temperature.

22. The system of claim 1, wherein the specified target preheated temperature is associated with a maximum driving range temperature.

23. The system of claim 1, wherein the specified target preheated temperature on a maximum performance temperature.

* * * * *